(12) United States Patent
Volk

(10) Patent No.: US 8,498,468 B1
(45) Date of Patent: Jul. 30, 2013

(54) MASK INSPECTION

(75) Inventor: William W. Volk, San Francisco, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 3390 days.

(21) Appl. No.: 10/674,921

(22) Filed: Sep. 30, 2003

(51) Int. Cl.
*G06K 9/00* (2006.01)

(52) U.S. Cl.
USPC .......................................................... 382/144

(58) Field of Classification Search
USPC .......................................................... 382/144
See application file for complete search history.

(56) References Cited

U.S. PATENT DOCUMENTS

| | | | | |
|---|---|---|---|---|
| 4,155,642 A | * | 5/1979 | Lacombat | 355/53 |
| 4,742,553 A | * | 5/1988 | Irwin | 382/299 |
| 5,761,336 A | * | 6/1998 | Xu et al. | 382/141 |
| 5,923,416 A | * | 7/1999 | Rosow et al. | 356/124.5 |
| 2005/0002554 A1 | * | 1/2005 | Schulze et al. | 382/144 |

OTHER PUBLICATIONS

Kaneko et al., "Hybrid Lithography System Using E-beam Direct Writer and Optical Stepper," 1993 Oct. 18-19, IEEE/SEMI, pp. 142-147.*

* cited by examiner

*Primary Examiner* — John Strege
(74) *Attorney, Agent, or Firm* — Luedeka Neely Group, P.C.; Rick Barnes

(57) ABSTRACT

A method of inspecting a mask, where a structure on the mask is optically imaged at a resolution specified by a criteria set including at least one of a method by which the structure was formed, a tolerance, and a structure type, to produce an optical image. The optical image is compared to a baseline image, and the differences between the optical image and the baseline image are identified. The differences are compared to a threshold value, and any differences that exceed the threshold value are flagged as defects.

20 Claims, 1 Drawing Sheet

50

MASK INSPECTION

FIELD

This invention relates to the field of integrated circuit fabrication. More particularly, this invention relates to methods for inspecting masks used in the fabrication of integrated circuits.

BACKGROUND

The fabrication of integrated circuits typically involves transferring circuit patterns from a photolithographic mask or reticle onto a photosensitive resist layer on a substrate, such as a semiconductor substrate. As the terms are typically used, a mask may be somewhat different than a reticle. A mask, for example, typically includes a pattern that covers an entire substrate, while a reticle includes a pattern that covers only a few devices, and which is stepped across the surface of the substrate to pattern the entire substrate. In addition, a mask is typically a one to one representation of the images to be formed, while a reticle may be a larger representation of the images to be formed, such as a four to one representation, which is then optically reduced in size during the exposure process. However, as used herein, the term "mask" is intended to include all such imaging structures, whether they be masks or reticles.

After a pattern from the mask has been defined in the resist layer, a process is performed on the substrate, such as etching or doping an underlying layer, or depositing a new layer. Once this has been accomplished, the layer of resist is removed. Multiple different patterns are repeatedly transferred onto the substrate in this general manner, with each step typically using a different mask or mask to form the separately patterned layers. At the end of the fabrication process the substrate is singulated into a plurality of dice for subsequent packaging as separate integrated circuits.

There are a few different methods by which a mask can be formed. The fabrication process generally begins with data corresponding to the circuit pattern, which is typically a representational layout of the physical layers of the integrated circuit. However, there are different methods by which the data is transferred to a physical representation of an image on the mask substrate. One general method is by directly writing the image onto the mask substrate, and another general method is by using an intermediate imaging technique, such as a photo repeater. Each method has its benefits and drawbacks.

A mask writer typically uses an imaging system such as a laser scanner or an electron beam writer. With this method, the image data is written directly onto the mask substrate, such as burning away an opaque layer on the transparent mask substrate, depositing an opaque layer in a pattern on the mask substrate, or directly exposing a pattern into a photoresist layer on the mask substrate. Regardless of the specific method used, direct writing of the desired pattern is accomplished without any type of intermediate structure. Direct writing of the mask is a good method to be used when, for example, the pattern to be formed on the mask is highly customized. By direct writing such a customized pattern, other intermediate imaging structures do not need to be formed as a part of the mask fabrication process. Typically, such intermediate structures cost a lot to produce. Since the intermediate structures for a highly customized pattern would not be widely used thereafter, their cost would have to be entirely absorbed by the few masks in which they were used. Thus, direct writing of a mask may tend to reduce the cost of the mask in certain circumstances.

The other general method of mask fabrication uses a master mask, which is an intermediate structure used to pattern the mask being fabricated. Typically, patterns on the master mask are formed at a larger size, and are then reduced during the exposure process onto the mask being formed. Thus, the patterns on the master mask are repeated as many times as desired onto the mask being fabricated. Mask repeaters are typically used to fabricate masks that include standard device patterns, such as patterns for central processing units, random access memory, read only memory, digital signal processors, digital to analog converters, and other standard designs that are shared by devices such as system on chip and memory. Because the patterns for such functional units are typically used again and again in various integrated circuit designs, the cost of the intermediate structures is spread across many different mask sets. Thus, photo repeating tends to reduce the cost of certain masks formed with this method.

In some instances, both direct writing and photo repeating are used to form a mask. For example, some portions of the integrated circuit pattern of a given layer may be formed by direct writing of the pattern, and other portions of the integrated circuit pattern of the given layer may be formed by photo repeating from a master mask. Specifically, the patterns for standard functional units may be formed on the mask using photo repeating, while more customized functional units on the mask may be formed using direct writing.

Once fabricated, the mask is inspected for manufacturing defects. Inspection of the mask is typically accomplished using an automated inspection apparatus. Typically optical images of the mask structures are compared to baseline images. The baseline image may be generated from the circuit pattern data, from another mask, or from an adjacent corresponding image on the mask being inspected. During comparison of the images, any difference between the inspected structure and the baseline structure is compared to a threshold value, with any difference in excess of the threshold indicating a defect.

The magnification at which the inspection is conducted influences how many discrepancies are flagged between the inspected structure and the baseline structure. At a higher magnification, or in other words at a high resolution, a greater number of discrepancies are typically found, while at a lower magnification, or in other words at a lower resolution, a fewer number of discrepancies are typically found. Thus, it is desirable at the onset of inspection to specify the resolution at which the inspection will be conducted.

However, mask patterns formed by different methods tend to have different optimal inspection resolutions. For example, patterns imaged using mask repeaters generally have improved pattern uniformity and relatively smooth line edges, which generally tolerate a relatively higher inspection resolution. On the other hand, patterns imaged using direct writing generally have relatively rougher line edges, which generally require a relatively lower inspection resolution. In addition, different functional units on a mask layer may have different optimal critical dimension criteria, regardless of the method by which they are imaged on the mask, and thus would most preferably be inspected at different resolutions. Unfortunately, inspection equipment does not have the flexibility to make inspections at variable resolutions based upon such criteria.

What is needed, therefore, is a system for inspecting a mask using different resolutions that are tailored to the properties of the patterns being inspected.

SUMMARY

The above and other needs are met by a method of inspecting a mask, where a structure on the mask is optically imaged at a resolution specified by a criteria set including at least one of a method by which the structure was formed, a tolerance, and a structure type, to produce an optical image. The optical image is compared to a baseline image, and the differences between the optical image and the baseline image are identified. The differences are compared to a threshold value, and any differences that exceed the threshold value are flagged as defects.

In this manner, various structures on the mask can be inspected at different resolutions, based on the criteria set. Thus, for example, structures that require tighter tolerances on a critical dimension can be inspected at a higher resolution, and any differences that are detected can be compared to a tighter threshold. On the other hand, structures that do not require such a tight tolerance on a critical dimension can be inspected at a lower resolution, and any differences that are detected can be compared to a looser tolerance. Further, portions of the mask that are formed with a photo repeater, and which tend to have very clean edges, can also be inspected with a higher resolution or a tighter tolerance, while other portions of the mask that are formed with direct writing, and which tend to have rougher edges, can be inspected with a lower resolution or a looser tolerance. Thus, the inspection of the various portions of the mask are tailored to the characteristics of that portion of the mask, and the inspection parameters dynamically change as appropriate during the inspection process.

In various preferred embodiments, a higher resolution is used when the method by which the structure was formed is a photo repeater method. On the other hand, a lower resolution is preferably used when the method by which the structure was formed is a direct writing method. A higher resolution is preferably used when the structure type requires a more exact critical dimension, and a lower resolution is preferably used when the structure type requires a less exact critical dimension. In one embodiment the threshold value is zero. Preferably, the threshold value is dependant on at least one of the method by which the structure was formed, a tolerance, and the structure type. In one embodiment, at least one of the method by which the structure was formed, the tolerance, and the structure type are read from a database by an instrument on which the method is performed. In another embodiment at least one of the method by which the structure was formed, the tolerance, and the structure type are input to an instrument on which the method is performed. The threshold value is read from a database by an instrument on which the method is performed in one embodiment, and in an alternate embodiment the threshold value is input to an instrument on which the method is performed.

According to another aspect of the invention there is described a mask inspection device adapted to inspect a mask. The mask inspection device includes an optical system to image a structure on the mask at a variable resolution, and produce an optical image. A controller specifies the resolution at which the structure is imaged based on a criteria set including at least one of a method by which the structure was formed, a tolerance, and a structure type. The controller compares the optical image to a baseline image, identifies differences between the optical image and the baseline image, compares the differences to a threshold value, and flags as defects any differences that exceed the threshold value.

In various preferred embodiments, a higher resolution is used when the method by which the structure was formed is a photo repeater method, and a lower resolution is used when the method by which the structure was formed is a direct writing method. Preferably, a higher resolution is used when the structure type requires a more exact critical dimension, and a lower resolution is preferably used when the structure type requires a less exact critical dimension. In one embodiment the threshold value is zero. The threshold value is preferably dependant on at least one of the method by which the structure was formed, the tolerance, and the structure type. At least one of the method by which the structure was formed, the tolerance, and the structure type are preferably read from a database by the inspection device.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
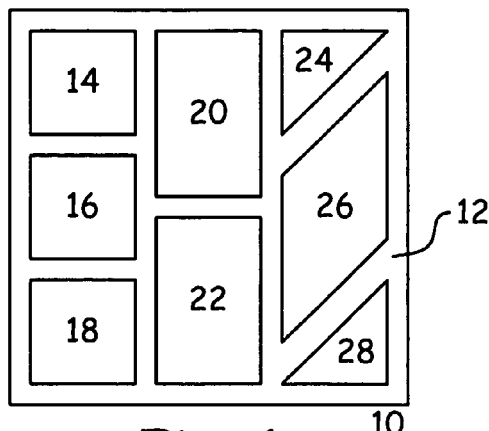
FIG. 1 is a representational view of an integrated circuit.

With reference now to FIG. 1, there is depicted a representation of an integrated circuit 10 formed on a substrate 12 and having defined thereon a plurality of functional blocks 14-28. Each functional block 14-28 represents a component of the integrated circuit 10 that has been formed using a mask to pattern the substrate 12 with the circuit pattern corresponding to the functional block. It is appreciated that within each functional block there are defined many structures, also referred to variously as elements or features, which structures have not been depicted so as to not overly burden the figures with excessive detail that does not significantly increase an understanding of the present invention.

As depicted in FIG. 1, functional blocks 14-22 are arranged in what is commonly called a Manhattan configuration, and functional blocks 24-28 are arranged in what is commonly called a non Manhattan configuration. In a Manhattan configuration, the functional blocks 14-22 are disposed in an orthogonal arrangement, with the spaces between the functional blocks 14-22 running parallel and perpendicular to the peripheral edges of the substrate 12. In a non Manhattan configuration, the functional blocks 24-28 are disposed in a skewed arrangement, with the spaces between the functional blocks 24-28 running at angles other than ninety degrees to the peripheral edges of the substrate 12.

Figure 2:
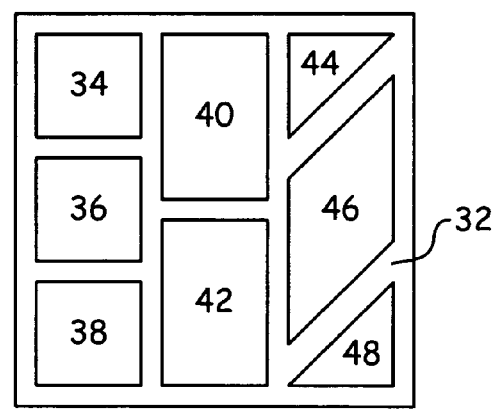
FIG. 2 is representational view of one of the masks used to fabricate the integrated circuit of FIG. 1.

It is appreciated that the integrated circuit 10 of FIG. 1 is formed using a variety of masks, such as mask 30 depicted in FIG. 2. Mask 30 contains the patterns for a single layer of the integrated circuit 10 of FIG. 1. Thus, Mask 30 also contains functional blocks 34-48 disposed on a substrate 32. Similar to that as described above in regard to the integrated circuit 10, the mask 30 has functional blocks 34-42 disposed in a Manhattan configuration, and blocks 44-48 disposed in a non Manhattan configuration.

As depicted in FIGS. 1 and 2, functional blocks 24, 26, and 28 of the integrated circuit 10 and functional blocks 44, 46, and 48 or the mask 30 are depicted as having non Manhattan shapes. Typically, an integrated circuit 10 and mask 30 at a large scale block and die level as depicted would have strictly Manhattan shapes. It is the actual circuit features (substantially undetectable at the level depicted in the figures) within the block or die that may have non Manhattan geometry. So, at the level of detail as provided in FIGS. 1 and 2 as depicted, one would expect to see rectangular geometries only. However, the blocks 24, 26, 28, 44, 46, and 48 have been depicted as having non Manhattan geometries for the sake of simplifying the figures, and so as to not become overly burdensome in detail. Thus, it is appreciated that the blocks 24, 26, 28, 44, 46, and 48 are representative of much smaller non Manhattan pattern features that have diagonal, horizontal, and vertical lines and dimensions.

When non Manhattan functional blocks, such as functional blocks 44-48, are directly written with a pattern generator, the edges of the various features tend to be especially rough. Thus, non Manhattan functional blocks 44-48 are especially good candidates for being formed on the mask using a photo repeater method, which tends to form very smooth line edges in the features of the non Manhattan functional blocks 44-48 so formed. Of course, it is possible to form any of the functional blocks 34-48 using either pattern generation or photo repetition, as desired. However, as indicated herein, there may be reasons in a particular case for a given functional block 34-48 to be formed with one or the other of the two methods.

Some of the functional blocks 34-48 may be formed from standardized functional blocks that are maintained in a pattern library, and which perform functions that are commonly used in a variety of different integrated circuit 10 designs. Others of the functional blocks 34-48 may be formed in a highly customized manner, and thus are not used in many different integrated circuit designs. However, the patterns for such customized functional blocks are preferably fully specified, and can be placed in a library, even though they may not ever be used for another integrated circuit pattern. Thus, the patterns for each of the functional blocks 34-48 are all preferably available in an electronic format that is readable by a properly programmed computing device. These electronically readable patterns are preferably used to create the functional blocks on the mask.

Figure 3:
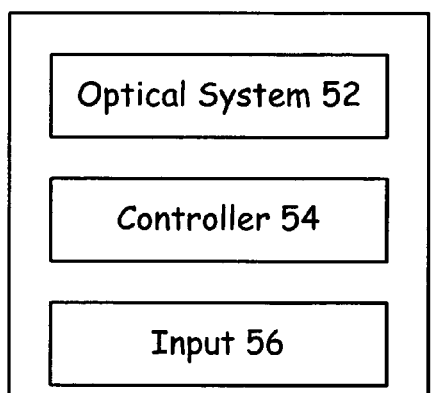
FIG. 3 is a functional embodiment of a mask inspection device according to the present invention.

As introduced elsewhere herein, the mask is preferably inspected after it has been fabricated, to ensure that the various elements within the functional blocks 34-48 have been formed correctly. Such inspection is preferably accomplished on a mask inspection device 50, such as depicted in FIG. 3, which images a portion of the mask at a time, and compares the imaged portion to some type of baseline reference. For example, the baseline reference may be as simple as comparing two similar portions of the mask to each other. If there is any difference between the two imaged portions of the mask, the difference is interpreted as some type of flaw. If the flaw is of a great enough severity, then the difference is interpreted as a mask defect.

The mask inspection device 50 according to the present invention is preferably able to make such comparisons, but has additional capabilities. For example, the mask inspection device 50 according to the present invention is preferably able to receive input through an input 56 in regard to different sections of the mask that are inspected, and using this input is able to make such inspections at different optical resolutions, with an optical system 52. This information can be input manually, such as by an operator, but is most preferably retrieved in an automated fashion, such as from an online database.

In a most preferred embodiment, the inspection device 50 is adapted to read the pattern files from which the mask was generated through the input 56. In this embodiment, the inspection device 50 can determine the methods used to create the various portions of the mask from the pattern file, and can adjust the resolution of the optical system 52 accordingly during the inspection process for those portions. In other embodiments, the input information is in regard to the desired critical dimensions for a given portion of the mask, and again, the resolution of the optical system 52 used during the inspection process for those portions is adjusted accordingly.

In one embodiment, the controller 54 for the inspection device 50 reads the information from the mask library, which was used to create the mask, through the input 56 as the mask is inspected. Thus, as the optical system 52 is optically inspecting the mask and sending optical information to the controller 54, the controller 54 is comparing that optical information to the pattern information that was used to create the mask. Thus, the baseline reference in this embodiment comes from the data used to create the mask in the first place.

Additionally, the controller 54 can determine, from the pattern information read through the input 56 from the pattern library, the method by which a given portion of the mask was fabricated, and can adjust the resolution of the optical system 52 accordingly. Further, the controller 54 can also receive or determine other information on which it can adjust the resolution of the optical system 52 for a given portion of the mask. For example, the controller 54 may access a recipe which instructs the controller 54 to inspect some portions of the mask with a higher resolution, and other portions of the mask with a lower resolution. As another example, the controller 52 in one embodiment determines from the input the type of structure on the mask that is being inspected, and adjusts the resolution of the optical system 52 based on the structure type. Thus, structures that require a tighter tolerance on a critical dimension can be inspected at a higher resolution, and structures that can allow a looser tolerance on a critical dimension can be inspected at a higher resolution.

In this manner, the resolution of the optical system 52 of the inspection device 50 is dynamic and changeable under the control of the controller 54, as it receives input through the input 56. By increasing the resolution of the optical system 52 for certain portions of the mask inspection, a more thorough inspection can be performed in those portions which require such. However, by being able to reduce the resolution of the optical system 52 for other portions of the mask inspection, inspection speed can be increased because of the reduced amount of data that is delivered per unit time for a lower resolution inspection. Thus, the inspection system 50 according to the present invention provides benefits and versatility that are not found in prior art systems.

The controller 54 determines a difference between the optical information received from the optical system 52 and the baseline reference, whether that baseline reference is another portion of the same mask, a similar portion of a different mask, or the pattern information received through the input 56. The difference between the optical information and the baseline is compared to a threshold, and if the threshold is exceeded, then the difference is flagged as a mask defect.

Most preferably, the threshold value is also variable for different portions of the mask, as determined by the controller 54. As mentioned above in regard to the resolution adjustment, the value for the threshold can also be determined based at least in part on information received through the input 56. For example, the method by which a given portion of the mask was fabricated can determine the threshold value by which a defect is determined. Additionally, the structure type that is being inspected can also be used to determine the threshold value. Further, the threshold can also be determined based on a tolerance value that is read by the controller 54, such as from a recipe.

Thus, one or both of a resolution of the inspection and a threshold by which a difference is flagged as a defect can be dynamically configured based on one or more of a variety of different inputs to the inspection device 50.

The method and apparatus of the invention is preferably implemented on any suitable inspection tool. For example, a KLA TeraStar and TeraScan Mask Inspection Systems, commercially available from KLA-Tencor Corporation of San Jose, Calif., may be adapted for such use.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of inspecting a mask, the method comprising the steps of:
    optically imaging a structure on the mask at a resolution specified by a criteria set including a method by which the structure was formed, to produce an optical image,
    comparing the optical image to a baseline image,
    identifying differences between the optical image and the baseline image,
    comparing the differences to a threshold value, and
    flagging as defects any differences that exceed the threshold value.

2. The method of claim 1, wherein a higher resolution is used when the method by which the structure was formed is a photo repeater method.

3. The method of claim 1, wherein a lower resolution is used when the method by which the structure was formed is a direct writing method.

4. The method of claim 1, wherein the criteria set includes a structure type, and a higher resolution is used when the structure type requires a more exact critical dimension.

5. The method of claim 1, wherein the criteria set includes a structure type, and a lower resolution is used when the structure type requires a less exact critical dimension.

6. The method of claim 1, wherein the threshold value is zero.

7. The method of claim 1, wherein the threshold value is dependant on at least one of the method by which the structure was formed, a tolerance, and a structure type.

8. The method of claim 1, wherein the method by which the structure was formed is read from a database by an instrument on which the method is performed.

9. The method of claim 1, wherein the method by which the structure was formed is input to an instrument on which the method is performed.

10. The method of claim 1, wherein the threshold value is read from a database by an instrument on which the method is performed.

11. The method of claim 1, wherein the threshold value is input to an instrument on which the method is performed.

12. A mask inspection device adapted to inspect a mask, the mask inspection device comprising:
    an optical system adapted to image a structure on the mask at a variable resolution, and produce an optical image, and
    a controller adapted to,
        specify the resolution at which the structure is imaged based on a criteria set including a method by which the structure was formed,
        compare the optical image to a baseline image,
        identify differences between the optical image and the baseline image,
        compare the differences to a threshold value, and
        flag as defects any differences that exceed the threshold value.

13. The mask inspection device of claim 12, wherein a higher resolution is used when the method by which the structure was formed is a photo repeater method.

14. The mask inspection device of claim 12, wherein a lower resolution is used when the method by which the structure was formed is a direct writing method.

15. The mask inspection device of claim 12, wherein the criteria set includes a structure type, and a higher resolution is used when the structure type requires a more exact critical dimension.

16. The mask inspection device of claim 12, wherein the criteria set includes a structure type, and a lower resolution is used when the structure type requires a less exact critical dimension.

17. The mask inspection device of claim 12, wherein the threshold value is zero.

18. The mask inspection device of claim 12, wherein the threshold value is dependant on at least one of the method by which the structure was formed, a tolerance, and a structure type.

19. The mask inspection device of claim 12, wherein the method by which the structure was formed is read from a database by the mask inspection device.

20. A mask inspection device adapted to inspect a mask, the mask inspection device comprising:
    an optical system adapted to image a structure on the mask at a variable resolution, and produce an optical image, and
    a controller adapted to,
        read from a database a method by which the structure was formed,
        specify the resolution at which the structure is imaged based on a criteria set including the method by which the structure was formed, wherein a higher resolution is used when the method by which the structure was formed is a photo repeater method and a lower resolution is used when the method by which the structure was formed is a direct writing method,
        compare the optical image to a baseline image,
        identify differences between the optical image and the baseline image,
        compare the differences to a threshold value, wherein the threshold value is dependant on the method by which the structure was formed, and
        flag as defects any differences that exceed the threshold value.

* * * * *